(12) United States Patent
Walsh et al.

(10) Patent No.: US 9,972,429 B2
(45) Date of Patent: May 15, 2018

(54) SUPERCONDUCTING CURRENT PUMP

(71) Applicants: VICTORIA LINK LIMITED, Wellington (NZ); Rowan Martin Walsh, Lower Hutt (NZ); Christopher William Bumby, Wellington (NZ); Rodney Alan Badcock, Lower Hutt (NZ); Robert Andrew Slade, Porirua (NZ); Zhenan Jiang, Lower Hutt (NZ); Kent Anthony Hamilton, Lower Hutt (NZ); Michael Graeme Fee, Wellington (NZ)

(72) Inventors: Rowan Martin Walsh, Lower Hutt (NZ); Christopher William Bumby, Wellington (NZ); Rodney Alan Badcock, Lower Hutt (NZ); Robert Andrew Slade, Porirua (NZ); Zhenan Jiang, Lower Hutt (NZ); Kent Anthony Hamilton, Lower Hutt (NZ); Michael Graeme Fee, Wellington (NZ)

(*) Notice: Subject to any disclaimer, the term of this patent is extended or adjusted under 35 U.S.C. 154(b) by 0 days. days.

(21) Appl. No.: 15/503,214

(22) PCT Filed: Aug. 11, 2015

(86) PCT No.: PCT/IB2015/056094
§ 371 (c)(1),
(2) Date: Feb. 10, 2017

(87) PCT Pub. No.: WO2016/024214
PCT Pub. Date: Feb. 18, 2016

(65) Prior Publication Data
US 2017/0236627 A1    Aug. 17, 2017

(30) Foreign Application Priority Data
Aug. 11, 2014 (NZ) .......................... 628556

(51) Int. Cl.
*H01F 6/00* (2006.01)
*H01F 6/04* (2006.01)
(Continued)

(52) U.S. Cl.
CPC ............. *H01F 6/006* (2013.01); *F17C 3/085* (2013.01); *H01F 6/005* (2013.01); *H01F 6/008* (2013.01);
(Continued)

(58) Field of Classification Search
CPC ........... H01F 6/005; H01F 6/006; H01F 6/008
See application file for complete search history.

(56) References Cited

U.S. PATENT DOCUMENTS

2004/0155538 A1* 8/2004 Kalsi .................... H02K 19/38
                                                    310/52

* cited by examiner

*Primary Examiner* — Ramon M Barrera
(74) *Attorney, Agent, or Firm* — Dann, Dorfman, Herrell and Skillman, P.C.

(57) ABSTRACT

A superconducting current pump arranged to cause a DC electrical current to flow through a superconducting circuit accommodated within a cryogenic enclosure of a cryostat comprises a rotor external to the cryogenic enclosure and a stator within the cryogenic enclosure, the rotor and stator separated by a gap through which passes a thermally insulating wall of the cryogenic enclosure, the rotor and the stator comprising at least in part a ferromagnetic material to concentrate magnetic flux in a magnetic circuit across the gap between the rotor and the stator and through the wall, so that movement of the rotor external to the cryogenic enclosure relative to the stator within the cryogenic enclosure induces a DC transport current to flow around the superconducting circuit within the cryogenic enclosure. There is no coupling between a drive motor external to the cryogenic enclosure and an internal rotor which may introduce a path for heat leakage into the cryostat, in turn increasing the heat (Continued)

load and thus increasing the cooling power required to maintain the cold components within the cryogenic enclosure at the low operating temperature required.

20 Claims, 11 Drawing Sheets

(51) Int. Cl.
*F17C 3/08* (2006.01)
*H01F 6/06* (2006.01)
*H02K 1/12* (2006.01)
*H02K 1/27* (2006.01)
*H02K 9/19* (2006.01)
*H02K 55/00* (2006.01)
*H02P 7/00* (2016.01)

(52) U.S. Cl.
CPC ............... *H01F 6/04* (2013.01); *H01F 6/06* (2013.01); *H02K 1/12* (2013.01); *H02K 1/2786* (2013.01); *H02K 9/19* (2013.01); *H02K 55/00* (2013.01); *H02P 7/00* (2013.01)

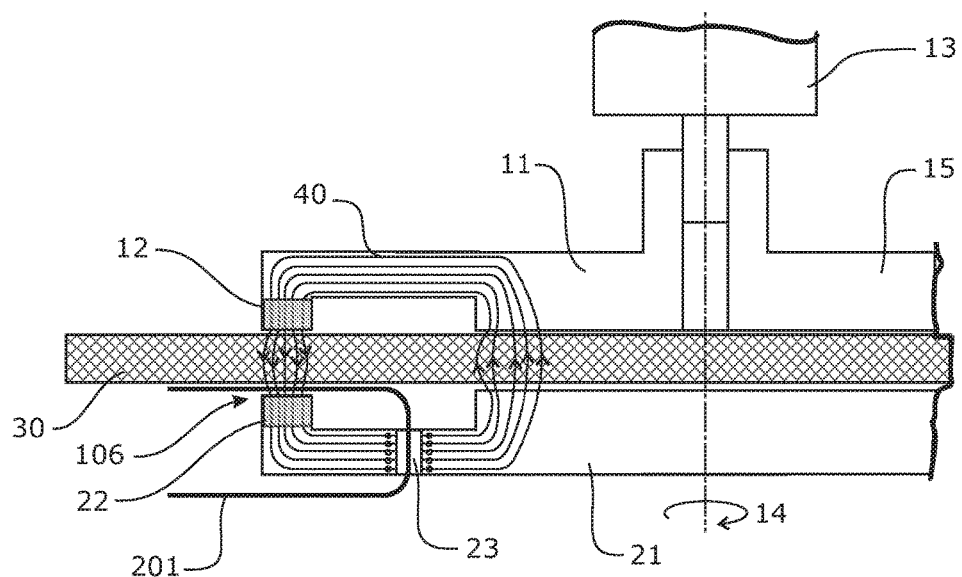
FIGURE 4
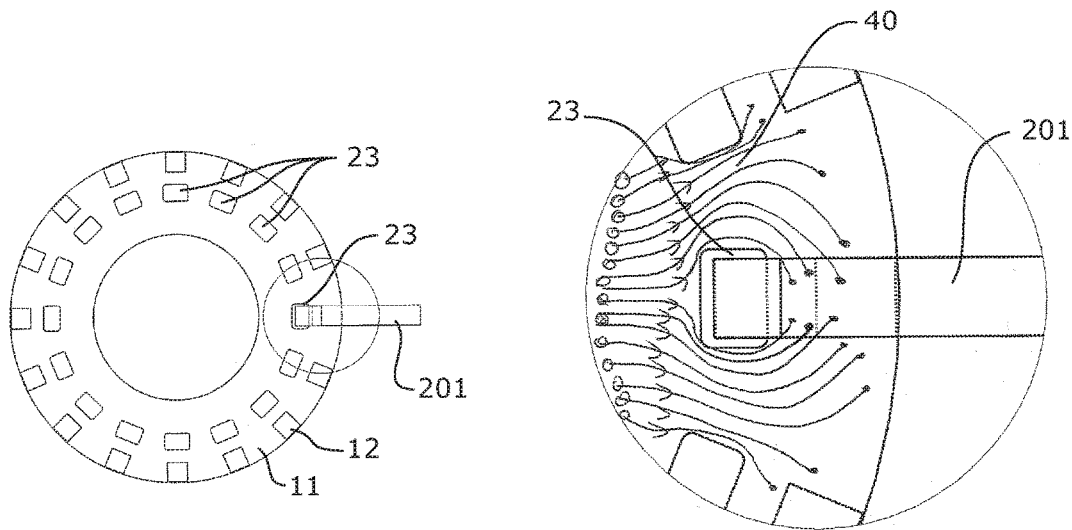
FIGURE 5a   FIGURE 5b

SUPERCONDUCTING CURRENT PUMP

FIELD OF THE INVENTION

The invention relates to a superconducting current pump for energizing a superconducting circuit.

BACKGROUND

The commercial production and application of high temperature superconducting (HTS) wire is well established. High temperature superconductor materials are type II superconductors with a high superconducting transition temperature ($T_c$), typically such that $T_c > 77K$. Electromagnetic coils wound from HTS wire can achieve high magnetic fields due to the extremely low-levels of heat dissipation at high current densities when operated at temperatures below $T_c$. In order to maintain the temperature below $T_c$ it is necessary to contain the superconducting coil within a cryostat that is coupled to a cooling source. Electrical current is usually supplied to an HTS superconducting circuit via an electrical circuit which includes current leads made from a normal conducting metal. These current leads penetrate the cryostat wall to link the superconducting circuit to an electrical current source located outside of the cryostat enclosure. Such current leads are a significant source of heat load upon the cryogenic environment due to both heat conduction along, and ohmic dissipation within, the current leads, which are operated at high currents. In addition, the accompanying electrical current source and high current cables have a large footprint, are not easily portable, and are expensive.

Low temperature superconducting (LTS) wire (such as NbTi) is often used to form electromagnetic coils. LTS wire can be joined with superconducting joints, allowing fully superconducting circuits to be manufactured. Fully superconducting circuits can be excited with an external current source in such a way as to maintain a persistent superconducting current around the circuit after the external current source is removed. At present it is not practical to achieve a superconducting joint between HTS conductors in a manufacturing situation. Hence HTS circuits cannot operate in persistent current mode, and it is necessary to leave the external current source connected at all times to balance losses in the resistive joints in the superconducting circuit.

Electromagnetic induction has been used to generate a current within the superconducting circuit without physical connection to the circuit. Apparatus which employ this approach have previously been referred to as a "superconducting DC dynamo" or a "superconducting flux pump". The term "flux pump" is used to refer to a wide range of devices which induce either persistent bulk magnetisation within a bulk superconducting material or produce a net current to flow around a superconducting circuit. In this specification the term "superconducting current pump" refers to a device which induces a net current to flow around a superconducting circuit. The term "rotating flux pump" and "current pump" are used interchangeably in this specification.

Superconducting flux pumps can be broadly classified as either switched-type flux pumps or rotating-type flux pumps. A switched flux pump has no moving parts and flux pumping is achieved by operating switches in the circuit. For example international patent application publication WO2010/070319 reports a flux pump that magnetises a bulk piece of high temperature superconductor (HTS) material through the use of switchable magnetic material. Rotating flux pumps have moving parts including a rotor which moves relative to a stator containing part of a superconducting circuit to be energized. The rotor carries a source of magnetic flux, such as one or more permanent magnets. The rotor is positioned close to the stator so that the magnetic flux from the source penetrates a section of the superconducting circuit and traverses the superconductor to induce a current in the superconducting circuit. A rotating flux pump requires that the gap between rotor and stator to be less than a few millimeters, to generate sufficient flux density in the superconducting circuit elements at the stator to enable current pumping to occur. The rotating parts are positioned inside the cryostat, and a mechanical coupling penetrates the cryostat wall to connect the rotor to a source of rotational motion, such as an electrical motor. Rotating flux pumps have been used with Type I or Type II superconducting materials which have a variety of transition temperatures ranging from NbTi (Tc=9.2 K) to YBCO (Tc≈95 K). The rotor and stator may be conveniently arranged in either a radial-flux geometry or an axial-flux geometry or a combination thereof. Radial-flux geometry means the rotor and stator pieces are arranged about a common concentric axis such that flux links cross a radial gap between the stator and rotor. Axial-flux geometry means the stator and rotor pieces are displaced linearly along a common axis such that flux links across an axial gap formed between the stator and rotor. For example, the flux pump arrangement reported in international patent application publication WO2012/018265 has a rotor carrying a series of permanent magnets which rotate in close proximity to an HTS stator wire to induce a current in the superconducting circuit.

It is an object of the invention to improve upon known superconducting flux pumps and their application to a superconducting circuit including an electromagnetic coil or at least to provide the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In broad terms in one aspect, the invention comprises a superconducting current pump arranged to cause a DC electrical current to flow through a superconducting circuit accommodated within a cryogenic enclosure of a cryostat, the superconducting circuit comprising a superconducting coil or coils and one or more superconducting elements, the current pump comprising a rotor external to the cryogenic enclosure and a stator within the cryogenic enclosure, the rotor and stator separated by a gap through which passes a thermally insulating wall of the cryogenic enclosure, the rotor comprising one or more magnetic field generating elements, and the rotor and the stator comprising at least in part a ferromagnetic material to concentrate magnetic flux in a magnetic circuit across the gap between the rotor and the stator and through the wall such that the magnetic flux penetrates through one or more superconducting element(s) of the superconducting circuit associated with the stator so that movement of the rotor external to the cryogenic enclosure relative to the stator within the cryogenic enclosure induces a DC transport current to flow through the superconducting circuit within the cryogenic enclosure.

The current pump is arranged to move the magnetic field generating element(s) relative to the superconducting element(s), thereby causing flux vortices to move through the superconducting element(s), such that there is a net flow of magnetic flux which traverses the superconducting element and drives a current around the superconducting circuit by inducing an electromotive force which develops a driving voltage across the impedance of the superconducting circuit.

In at least some embodiments the superconducting circuit comprises one or more superconducting coils to be energised and having sufficient inductance to incrementally accumulate current as the current in the magnetic circuit is increased in a step-wise fashion by the action of the moving magnetic field generating elements passing the superconducting elements.

The magnetic circuit formed between the rotor and stator yoke is arranged such that magnetic flux which penetrates the superconducting element(s) follows a return path to the rotor yoke which does not penetrate the superconducting circuit.

In at least some embodiments the magnetic field generating elements comprise at least one or a combination of permanent magnets, electromagnets and similar thereof. In one form, the magnetic field generating elements may comprise only one or more permanent magnets.

In one form, the rotor and stator are axially displaced from each other so as to form a gap in a direction substantially parallel to an axis of rotation of the rotor. Alternatively the rotor and stator are arranged concentrically so as to form a radial gap in a direction that is substantially perpendicular to an axis of rotation of the rotor.

In at least some embodiments the gap is in the range of about 2-30 mm. More preferably the gap is more than about 6 mm, or more than about 10 mm, or more than about 15 mm. In another form the gap may be more than about 30 mm.

In one form, the stator and rotor yokes are each formed in a cylindrical shape and the superconducting element(s) is/are arranged on a surface of the stator cylinder, and the magnetic field generating elements are arranged on a surface of the rotor cylinder.

In at least some embodiments the cylindrical rotor assembly is located inside or outside the cylindrical stator assembly, and wherein the cryostat wall is arranged so as to avoid any re-entrant feature through the cryostat wall.

In another form, the stator and rotor yokes comprise a pair of parallel discs and the superconducting element(s) is/are arranged radially on one surface of the stator disc, and wherein the magnetic field generating elements are arranged on one side of the rotor disc, at the outer circumference, facing the superconducting elements on the stator.

In at least some embodiments the current pump comprises a common carrier operable to rotate the rotor relative to the stator without substantially changing the gap between the rotor and stator.

In at least some embodiments the magnetic field generating elements are also arranged to move relative to the stator by the common carrier.

In one form the current pump comprises a control system which controls the speed of the rotor rotation.

In at least some embodiments the control system is operable to control the gap between the rotor and stator.

In one form the current pump comprises a sensor operable to provide a signal to the control system indicative of the current around the superconducting circuit.

In at least some embodiments the sensor is one or more of a current sensor, Hall sensor, GMR sensor, fluxgate magnetometer, EPR sensor or NMR sensor.

In at least some embodiments the current pump also comprises one or more temperature sensors operable to provide a signal to the control system indicative of the temperature of portions of the superconducting circuit, In one form the superconducting element(s) comprises one or more high temperature superconducting (HTS) materials. In at least some embodiments the HTS material possesses a superconducting transition temperature of >77K at zero magnetic field and atmospheric pressure. The superconducting material may comprise any one or more of the following materials: BiSrCaCuO, (Re)BaCuO (where Re is Y or Gd or other lanthanide rare earth), or any other suitable materials. In another form the superconducting elements(s) comprise at least in part $MgB_2$.

In one form the superconducting element comprises a wire, ribbon, tape, film, or any similar form. Preferably the thickness of the superconducting element is less than about 1 mm in its thinnest dimension. More preferably the superconducting material has a thickness of less than 100 um in its thinnest dimension, or less than 10 um in its thinnest dimension.

In some embodiments, the thinnest dimension is oriented perpendicularly to the axis to the rotation of the rotor. In some other embodiments the thinnest dimension is oriented parallel to the axis of rotation of the rotor.

In at least some embodiments the superconducting circuit enters the magnetic circuit of the current pump at the gap between the rotor and the stator, and experiences a high flux density in said gap. In at least some embodiments the superconducting circuit enters the magnetic circuit of the current pump at the gap between the rotor and the stator and experiences a flux density which is greater than the magnetic penetration field, $B_{pen}$ of the superconducting element.

In use the magnetic flux density in the gap is high enough to penetrate the superconducting element disposed about the stator and form localized flux vortices at a microscopic scale, yet not sufficiently high to eliminate a superconducting current path sufficient to carry the net transport current flowing through the superconducting circuit at a macroscopic level.

In one form the superconducting elements which are penetrated by magnetic flux from the magnetic field generating elements upon the rotor are divided lengthwise into two or more elements such that the width of each individual element is less than the width of a single superconducting element of the same total current carrying capacity. This is achieved in order to reduce dissipative energy losses within the superconducting current pump.

In at least some embodiments the ferromagnetic stator yoke is shaped to allow the superconducting circuit to exit the magnetic circuit of the current pump without experiencing a high flux density.

In at least some embodiments the stator comprises at least one opening for example an aperture or hole, or a channel, extending through the ferromagnetic yoke to allow the superconducting circuit to exit the magnetic circuit.

In one form, the rotor and stator yokes are fabricated from one or more ferromagnetic metals or a composite material comprising a ferromagnetic metal.

In one form the stator yoke comprises one or more ferromagnetic metals with a low magnetic coercivity.

In one form, the yokes comprise a stack of ferromagnetic sheets laminated using a non-ferromagnetic adhesive, or a distribution of ferromagnetic material within a non-ferromagnetic matrix.

In at least some embodiments the stator yoke comprises protrusions or poles which direct magnetic flux to the region of the superconducting element. In one form the stator yoke comprises an array of protrusions which interact with the magnetic field generating elements on the rotor so as to sequentially direct magnetic flux towards the superconducting element and then away from the superconducting element, to maximise the amplitude of the magnetic field variation experienced at the surface of the superconducting element.

In at least some embodiments the cryostat refrigeration system is a liquid cryogen operable to cool by latent heat of evaporation and/or a thermo-mechanical refrigerator. The thermo-mechanical refrigerator is one of a GM, Sterling or Pulse Tube refrigerator.

The cryostat wall comprises thermal insulation selected from at least one of a vacuum, multilayer insulation and/or cooled thermal shield. In at least some embodiments the cryostat wall disposed between the rotor and stator comprises low electrical conductivity materials, such as one or more of glass fibre composite material, stainless steel and/or thin and/or slitted multilayer foil.

In another form, the superconducting circuit comprises coils which are located upon the rotor of an electrical generator or motor and which are housed within a rotating cryostat, and the current pump rotor is situated outside the rotating cryostat and rotates relative to the current pump stator around the same axis as the rotor of the electrical generator or motor. In at least some embodiments the current pump stator and current pump rotor rotate relative to each other around the same axis as the axis of rotation of the rotating cryostat. In at least some embodiments the superconducting coils housed within the rotating cryostat form the rotor coils of an electrical generator or motor.

In one form, the superconducting elements are divided lengthwise into two or more elements such that the width of each individual element is less than the width of a single superconducting element with the same total current carrying capacity. In at least some embodiments the region of the superconducting element which passes through the magnetic circuit is divided into two or more lengthwise sections formed by striating the superconducting element.

As stated, the superconducting current pump of the invention comprises a rotor external to the cryogenic enclosure and a stator within the cryogenic enclosure. The rotor and stator are separated by a gap through which passes a thermally insulating wall of the cryogenic enclosure. The rotor comprises one or more magnetic field generating elements, and the rotor and the stator comprise at least in part a ferromagnetic material to concentrate magnetic flux in a magnetic circuit across the gap between the rotor and the stator and through the wall such that the magnetic flux penetrates through one or more superconducting element(s) of the superconducting circuit associated with the stator. Relative movement of the rotor external to the cryogenic enclosure induces a DC transport current to flow around the superconducting circuit within the cryogenic enclosure. Advantages of the invention may include that:

There is no coupling between a drive motor external to the cryogenic enclosure and an internal rotor which may introduce a path for heat leakage into the cryostat, in turn increasing the heat load and thus increasing the cooling power required to maintain the cold components within the cryogenic enclosure at the low operating temperature required. Heat leakage into the cryogenic enclosure increases the rate of boil off of liquid cryogen, or increases the cost, size and power consumption of the thermo-mechanical refrigerator.

There are no moving parts within in the cryostat which may cause turbulence and increase the boil off rate of a liquid cryogen.

There is no requirement for bearings within the cryogenic enclosure to support rotating parts, or lubricants for bearings, to reliably operate at cryogenic temperatures.

Generally, the absence of moving parts within the cryogenic enclosure removes the general requirement for extremely high reliability of moving parts within the cryostat. Disassembly of the cryostat for repair of faulty parts requires warming up of the magnet and breaking the vacuum seal. This is usually a complex, time consuming and expensive task.

A rotating superconducting current pump requires that a magnetic field must be periodically imposed upon a region of HTS material within a superconducting circuit such that magnetic flux vortices are formed within the HTS material. The flux vortices must fully penetrate the HTS material in the direction perpendicular to the desired direction of the net electrical current to be driven around the superconducting circuit. There is a minimum imposed magnetic field intensity at which full flux penetration occurs and this minimum penetration field is herein referred to as, $B_{pen}$.

Penetrating flux vortices can be moved through the HTS material by moving an imposed inhomogeneous magnetic field relative to the HTS material in a manner which drags the flux vortices in the direction of movement of the imposed field. In a rotating superconducting current pump this is achieved by rotating a rotor containing magnetic elements relative to a stator such that flux from magnetic elements upon the rotor pass across one or more sections of the superconducting circuit and periodically impose a moving region of high magnetic flux density at the superconductor surface such that the imposed field exceeds $B_{pen}$. The net motion of flux vortices through the HTS material leads to an induced EMF across the section of the superconducting circuit which drives and maintains a net current around a superconducting circuit that may include a superconducting coil.

It is a requirement for operation of the rotating superconducting current pump described herein that the magnetic field imposed at the superconducting element is less than the upper critical field, $B_{c2}$, of the HTS material in order to prevent quenching of the superconducting circuit. The upper critical field, $B_{c2}$, is the maximum imposed magnetic field at which a type II superconductor will exhibit superconducting behaviour.

In broad terms the invention also comprises a superconducting system comprising a superconducting circuit comprising at least a superconducting coil and one or more superconducting elements, said superconducting circuit mounted within a cryogenic enclosure for maintaining the superconducting circuit at or below a superconducting transition temperature, and a superconducting current pump as defined above arranged to energize the superconducting circuit.

A superconducting circuit may comprise one or more non-superconducting sections such as one or more normal conducting joints between sections of superconductor materials. In this specification the term "HTS" material refers to both type II superconducting material with a $T_c$>77K (at zero magnetic field and atmospheric pressure), and also refers to $MgB_2$ (which has a substantially lower $T_c$ of approximately 39K).

HTS wire refers to a length of wire or ribbon or tape within which is included one or more continuous lengths of HTS material. Examples of HTS wire that are commercially produced today include coated-conductor wires produced by Superpower Inc. and Fujikura Ltd. Various other manufacturers also supply coated-conductor HTS wire. Coated conductor HTS wire comprises a metal ribbon substrate upon which a layered series of one or more ceramic thin films are deposited. The stack of thin films includes a thin film layer (thickness <10 um) of HTS material (such as YBaCuO or GdBaCuO) and is deposited upon a metal ribbon substrate and the entire stacked structure is enclosed within one or more layers of metal coating material. Typically coated-conductor wire is approximately 100 um thick and can be produced in continuous lengths of >100 m. Another example of HTS wire that is produced today is BSCCO wire which is produced by Sumitomo. BSCCO wire comprises multiple filaments of BSCCO HTS material which are enclosed within a silver matrix to form a long wire with rectangular cross section. An example of $MgB_2$ wire is produced by Columbus Superconductors SpA.

A superconducting circuit must be operated at a low temperature to maintain superconducting properties. The temperature below which a material has superconducting properties is known as the critical temperature $T_c$. Typically, the superconducting circuit is placed inside a cryostat to maintain operation below the critical temperature. A cryostat comprises one or more thermally insulating walls or boundaries that impede the flow of heat from external sources into the superconducting components and their support structure (the "cold mass"). The residual heat flux is balanced by a source of cooling power, hence maintaining the cold mass at a constant temperature. The source of cooling power may be a cryogenic fluid which absorbs heat by evaporation, and/or a thermo-mechanical refrigerator, such as a Gifford-McMahon, Stirling or Pulse Tube refrigerator. Thermally conductive components are disposed between the cold mass and the refrigerator to direct the flow of heat, forming a cooling manifold.

As used herein:
- "(s)" following a noun means the plural and/or singular forms of the noun.
- "and/or" means "and" or "or", or both.
- "comprising" means "consisting at least in part of". When interpreting statements in this specification which include that term, the features, prefaced by that term in each statement or claim, all need to be present but other features can also be present. Related terms such as "comprise" and "comprised" are to be interpreted in the same manner.
- "rotor", "external to the cryogenic enclosure", and "DC current" and "DC transport current" induced in the superconducting circuit have the meanings referred to subsequently.

BRIEF DESCRIPTION OF THE DRAWINGS

The invention will now be further described by way of example only and with reference to the drawings in which:

FIG. 4 is a cross-section of part of embodiment of an axial-flux superconducting current pump.

FIG. 5a shows the stator yoke of the axial-flux superconducting current pump of FIG. 4.

FIG. 5b is a close up view of the distribution of magnetic flux lines around an aperture within the stator yoke of the axial-flux superconducting current pump of FIG. 4.

FIG. 6b is a cross-section of the axial-flux superconducting current pump of FIG. 6a along line I-I of FIG. 6a.

FIG. 9b is a close up view of part of the integrated superconducting current pump and electrical generator or motor of FIG. 13a.

DETAILED DESCRIPTION OF EMBODIMENTS

Figure 1A:
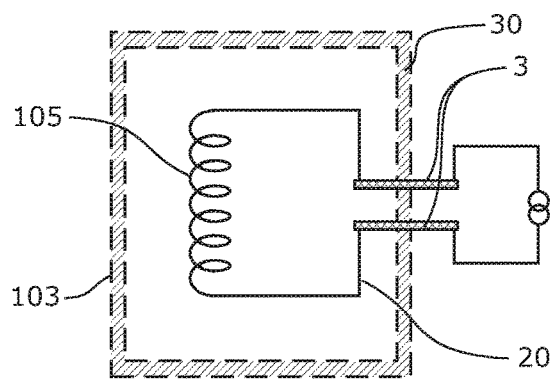
FIGS. 1a and 1b each schematically show prior art arrangements for injecting current into a superconducting circuit within a cryostat.

FIG. 1a schematically shows a prior art superconducting circuit 20 comprising an electromagnetic coil 105 which is contained within a cryostat 103. In operation the cryostat 103 comprising thermally insulating walls 30 maintains an internal temperature at or below the superconducting transition temperature of the superconducting elements within the superconducting circuit. The superconducting circuit 20 is energised using an external current source which injects current into the circuit by using normally conducting current leads 3 which penetrate the cryostat wall 30.

Figure 1B:
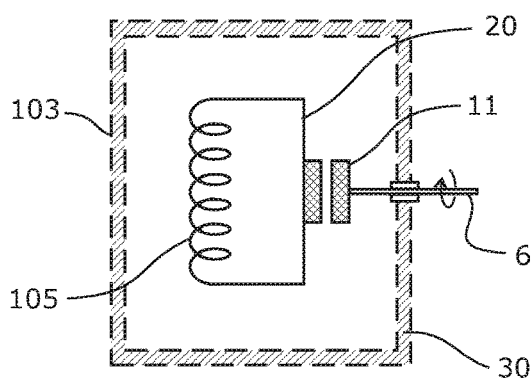

FIG. 1b schematically shows another prior art superconducting circuit 20 comprising an electromagnetic coil 105 which is contained within a cryostat 103. The superconducting circuit 20 is energised using a rotating flux pump comprising a rotor 11 located within the cryostat enclosure 103. A drive shaft 6 to the rotor 11 penetrates the cryostat wall 30.

Figure 1C:
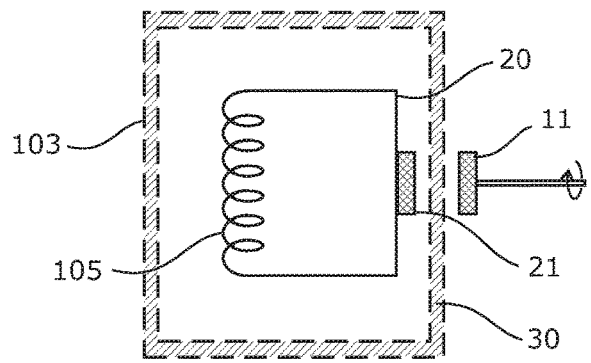
FIG. 1c schematically shows an arrangement for pumping current into a superconducting circuit within a cryostat according to the invention.

FIG. 1c schematically shows a superconducting circuit 20 comprising an electromagnetic coil 105 which is contained within a cryostat 103, which is energised by a superconducting current pump of the invention. The superconducting current pump comprises a rotor 11 outside of the cryogenic enclosure 103 and a stator 21 inside the enclosure. The means for rotating the rotor (not shown) such as an electric motor and motor controller are also outside of the cryogenic enclosure 103. The thermally insulating enclosure wall of the cryogenic enclosure passes between the rotor and the stator. The rotor comprises one or more magnetic field generating elements, and the rotor and the stator comprise at least in part a ferromagnetic material to concentrate magnetic flux in a magnetic circuit across the gap between the rotor and the stator and through the wall such that the magnetic flux penetrates through one or more superconducting element(s) of the superconducting circuit associated with the stator so that relative movement of the rotor external to the cryogenic enclosure induces a DC transport current to flow around the superconducting circuit within the cryogenic enclosure. Current is injected into the superconducting circuit 20 without penetrating the cryostat wall 30 by current leads 3 or by a drive shaft 6 as in FIGS. 1a and 1b.

Figure 3:
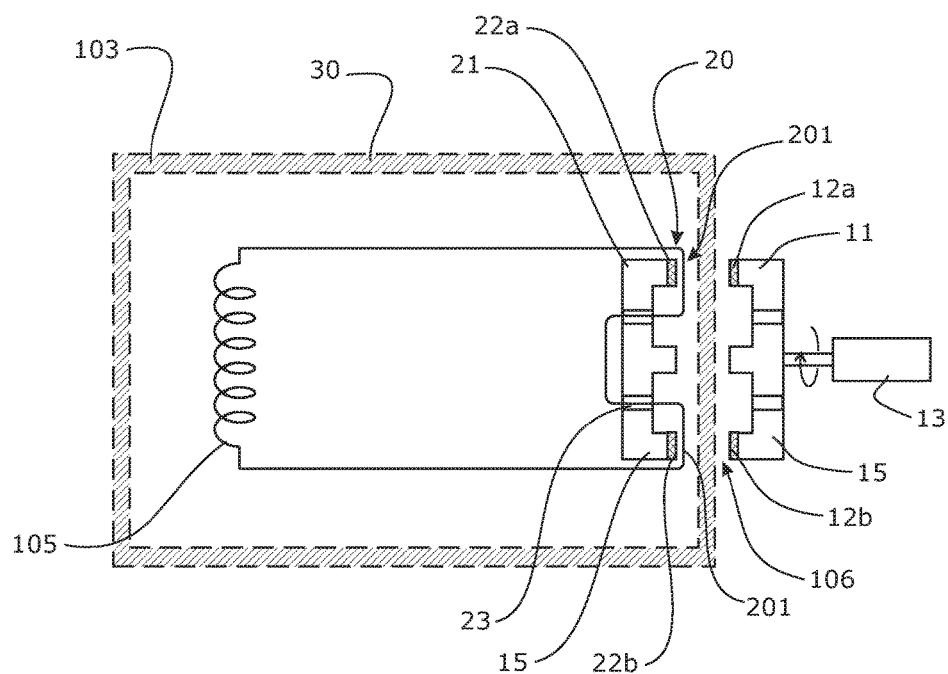
FIG. 3 schematically shows an embodiment of a superconducting flux pump of the invention in more detail.

FIG. 3 schematically shows an embodiment of a superconducting flux pump of the invention in more detail, FIG. 4 is a cross-section of part of the current pump, FIG. 5 shows the stator yoke of the current pump, and FIG. 5b is a close up view of the distribution of magnetic flux lines around an exit aperture within the stator yoke in use. The superconducting current pump is used to energize superconducting circuit 20 enclosed within cryostat 103. In the embodiment shown, the superconducting circuit 20 comprises a superconducting coil 105 and one or more superconducting elements 201 which are disposed about or partially within the stator yoke. The superconducting coil 105 and the one or more superconducting elements 201 may be joined by normal conducting joints (not shown).

According to the invention, the current pump comprises at least a rotor 11 and a stator 21, and each comprises at least in part a ferromagnetic yoke 15, which are separated by a gap 106 through which extends a wall 30 of the cryogenic enclosure 103. The size of the gap is at a minimum, the distance between the magnetic field generating element of the rotor, and the superconducting element of the stator. In one form, the gap 106 is in the range of about 2-30 mm, or is greater than about 6 mm, is greater than 10 mm, or is greater than 15 mm. In another form the gap is more than about 30 mm.

The current pump comprises one or more magnetic field generating elements 12 carried by the rotor 11 to provide magnetic flux across the gap 106 to penetrate the superconducting elements 201 associated with the stator 21. The pair of ferromagnetic yokes 15 of the rotor 11 and stator 21 jointly form a magnetic circuit of low reluctance which provides a pathway for the magnetic flux generated by the magnetic field generating elements 12 to cross the gap 106 and penetrate the superconducting elements 201, and then return to the rotor yoke 15 without penetrating the superconducting circuit for a second time.

As shown in FIG. 3, the superconducting element 201 passes through the gap 106 between the rotor 11 and the stator 21 where it is exposed to focused magnetic flux lines provided by the magnetic field generating elements 12. In the embodiment shown, superconducting element 201 first enters the gap 106 from a periphery of the stator 21, and then leaves the gap 106 via an exit opening 23 formed in the stator yoke 15. Thus the superconducting element 201 passes between the field generating elements 12 and 22 of the rotor and stator rotor in one direction but not another direction. The exit opening or aperture 23 comprises a higher reluctance region which enables the superconducting element 201 to exit the stator under low or no opposite magnetic field. It then re-enters the gap 106 after it passes another opening 23 and leaves the gap from an opposite end of the stator 21. In other embodiments, the superconducting element 201 may enter and exit the gap 106 only once, or for a plurality of times. In one embodiment, the stator yoke 15 comprises flux-concentrating ferromagnetic protrusions or poles 22a and 22b which are located opposite to the magnetic field generating elements 12a and 12b.

The rotor 11 is driven by electric motor 13. When a magnetic field generating element 12 moves past a ferromagnetic protrusion of the stator 21, the magnetic flux imposed at the surface of the superconducting element 201 is greater than $B_{pen}$ which is the minimum imposed magnetic field required for flux penetration of the superconductor. When the magnetic field generating elements 12 move relative to the superconducting element 201, magnetic flux vortices enter one side of the superconducting element 201 and subsequently exit from the opposite side. This results in a net flow of magnetic flux lines across the superconductor element 201 which causes a net electrical current (which may still have some ripple on it) to be pumped around the superconducting circuit 20 thereby energizing the superconducting coil.

As stated the rotor 11, drive motor 13, and an associated motor controller, are located outside of the cryogenic enclosure. The required separation is achieved by incorporating a ferromagnetic iron yoke in the stator and the rotor which jointly forms a magnetic circuit of low reluctance to guide the magnetic flux lines across the separation between the stator and the rotor. This is further explained with reference to FIGS. 2a-2c and FIG. 4.

Figure 2A:
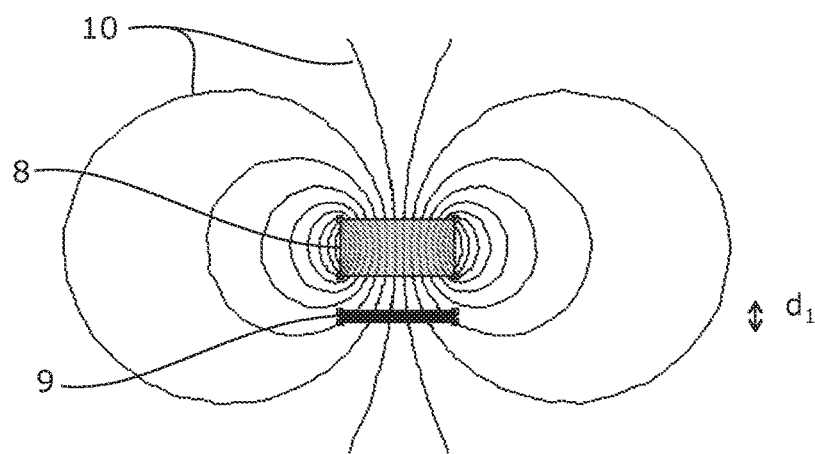
FIGS. 2a to 2c show how flux lines from a magnetic dipole deviate relative to a planar piece of superconducting material.
Figure 2B:
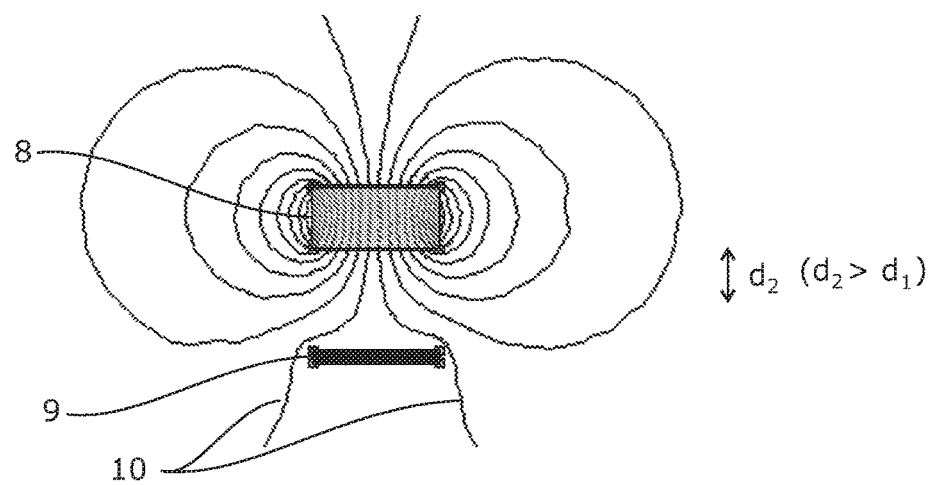
Figure 2C:
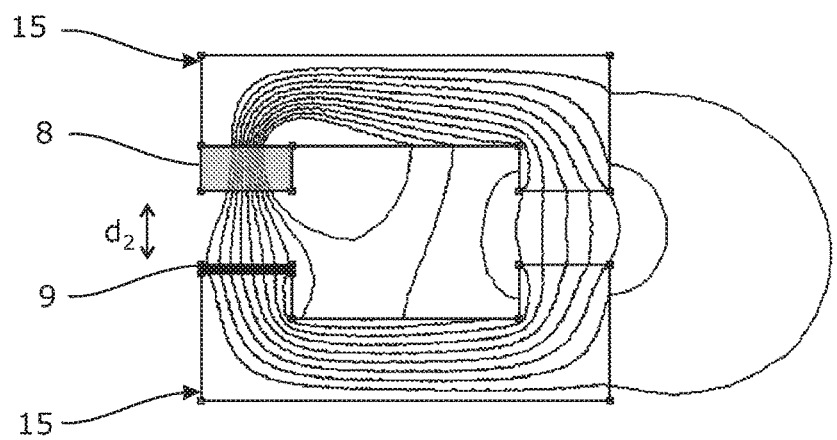

FIGS. 2a to 2c show three different arrangements of a permanent magnet and a thin strip of type II superconductor. In FIG. 2a a permanent magnet 8 is placed in close proximity to the surface of a superconductor 9 such that the imposed magnetic field is greater than $B_{pen}$, the magnetic field required for flux lines 10 to fully penetrate the superconductor 9. In this configuration a net current can be induced in the superconductor 9 by moving the permanent magnet across the surface of the superconductor so that flux lines are dragged through the superconductor material. $d_1$ indicates the axial displacement, between the permanent magnet 8 and the superconductor 9.

In FIG. 2b the axial displacement between the permanent magnet 8 and the superconductor 9 is indicated by $d_2$ and is larger than $d_1$ in FIG. 2a. As a result the magnetic field perpendicular to the superconductor surface is less than $B_{pen}$ and magnetic flux lines 10 are expelled from the superconductor 9. In this configuration it is not possible to induce a net current through the superconductor as flux lines cannot be dragged through the superconductor material.

In FIG. 2c the separation between the permanent magnet 8 and the superconductor strip is the same as in FIG. 2b, but ferromagnetic iron yokes 15 are arranged to form a magnetic circuit of reduced reluctance which passes through the superconductor strip. The presence of the iron yokes 15 leads to a concentration of flux at the superconductor surface, such that the local magnetic field intensity is greater than $B_{pen}$. In this configuration, it is again possible to induce a net current in the superconductor 9 by moving the permanent magnet 8 across the superconductor 9 surface so as to move flux lines through the superconductor material.

FIG. 4 shows a cross-section of part of an embodiment of an axial-flux type superconducting current pump. Rotor 11 is driven by motor 13 to rotate about axis 14 and sweep the magnetic field generating elements 12 past the stator 21 to drive lines of magnetic flux across the superconducting element 201 thus driving an electrical current to flow around the superconducting circuit 20.

The rotor 11 comprises ferromagnetic yoke 15 and one or more magnetic field generating elements 12 carried on the ferromagnetic yoke 15. A continuous magnetic flux path 40 that extends from the magnetic field generating elements 12, through the cryostat wall 30, into the stator 21 then back through the cryostat wall 30 to the rotor 11 is formed by the pair of ferromagnetic yokes 15. In one embodiment the ferromagnetic yoke of the stator 21 comprises one or more protruding portions 22 that are directly opposite to the magnetic field generating elements 12 when the rotor 11 rotates relative to the stator 21. At least a portion of the superconducting circuit 20 for example a superconducting element 201 is placed upon a protruding portion 22 of the ferromagnetic yoke 15. The ferromagnetic protruding portions 22 of the stator 21 have a focusing effect on the flux path 40 formed between the rotor 11 and stator 21 such that the magnetic field strength at the surface of the superconducting element 201 is increased compared to the case of a planar ferromagnetic yoke geometry without such protrusions 22.

The ferromagnetic yokes 15 in the rotor 11 and stator 21 are preferably of iron material or at least a ferromagnetic material with a low coercivity and low remnant field. In one form, the ferromagnetic yoke 15 is formed from a composite material comprising both ferromagnetic and non-ferromagnetic materials. For example, the yoke could be formed from laminated sheets of ferromagnetic metal interleaved with non-ferromagnetic insulating sheets to minimise eddy current losses. In another example, the ferromagnetic yoke is formed from ferromagnetic metal elements embedded within a non-ferromagnetic matrix material. The ferromagnetic yoke concentrates flux at the surface of the superconducting element 201 disposed about the stator 21 when the rotor magnetic field generating elements 12 pass across the superconducting element 201. The ferromagnetic yoke within the stator also ensures that the total amplitude of variation of the magnetic flux density is maximised for each magnetic field generating element 12 that passes over the superconducting element 201. In the embodiment shown, the stator yoke 15 is stationary relative to the superconducting circuit 20 and the cryostat 103. The rotor yoke rotates relative to these elements.

In one form, the superconducting element 201 is a high temperature or a low temperature superconducting element for example an HTS or a LTS wire, tape, or similar. The use of an HTS element as the superconducting element 201 upon the stator 21 enables operation at elevated temperatures compared to LTS superconducting circuits. At higher temperatures the conductor has a larger heat capacity which enables superconducting behaviour to be maintained in the presence of a substantially increased heat load. The increased heat load tolerance enables a reduction in the cryostat insulation, thickness or type, in the vicinity of the stator. For example, experimental verification shows insulation thickness in the range of about 10 to 15 mm provides adequate thermal insulation to maintain a stator temperature of approximately 50-77 K whilst pumping at a full current of up to 300 Amps.

Testing and electromagnetic modelling show that current can be pumped around a superconducting HTS circuit 20 comprising a superconducting HTS coil 105 and normally conducting joints using a superconducting current pump of the invention with a gap of >15 mm between the HTS superconducting element 201 and magnetic field generating elements 12. This is achieved through design of the magnetic circuit formed between the ferromagnetic yokes upon the rotor and stator to ensure that the maximum magnetic field intensity imposed periodically at the HTS superconducting element 201 is higher than minimum field required for flux penetration, $B_{pen}$.

In one form, the cryostat wall 30 that is placed within the flux gap 106 region between the stator 21 and rotor 15 comprises non-ferromagnetic materials, and in a preferred embodiment it does not comprise any metallic material. In some embodiments the cryostat wall 30 may include thin metallic sheets as part of a multi-layer insulation (MLI) element within the cryostat wall.

As stated, in one form, the ferromagnetic yoke 15 within the stator 21 may include a region of high reluctance to magnetic flux for allowing the superconducting circuit 20 to exit the stator region of the flux pump. The region of high reluctance may be an opening such as an aperture 23 as that shown in FIGS. 3 to 5 or any other similar form thereof which penetrates the stator yoke 15. The aperture 23 presents a high reluctance to magnetic flux compared to the surrounding ferromagnetic material in the yoke 15. The ferromagnetic material within the yoke 15 forms the return path of the magnetic circuit formed between the rotor, and the aperture 23 provides a region with low flux density through which the superconductor circuit 20 can exit the stator region of the magnetic circuit, without flux penetrating this section of the superconducting circuit.

FIG. 5b is a close up view of the distribution of magnetic flux lines around aperture 23 in the stator yoke and in particular shows the magnetic flux path 40 within the stator 21 which circumvents the aperture 23. The magnetic flux within the aperture is weak, and preferably below the critical field for flux penetration of the superconductor, $B_{pen}$. The aperture 23 thus provides an effective pathway through which the superconducting circuit 20 can efficiently pass out of the magnetic circuit without experiencing a region of moving magnetic flux strong enough to induce an emf which would otherwise oppose the action of the rotating magnetic field generating elements 12.

In some embodiments, the superconducting element 201 that forms part of the superconducting circuit 20 has a composite structure including both superconducting HTS material and non-superconducting materials. Preferably the HTS material within the HTS superconducting element is a film which is dimensionally thin in the direction parallel to the imposed magnetic flux lines such that at least some magnetic flux from the rotor periodically penetrates through the superconducting element such that it emerges from the opposite face of the superconducting element. In some embodiments, the superconducting element 201 is coated-conductor HTS wire which is orientated such that the thin axis is parallel to the direction of magnetic flux at the surface of the stator yoke protrusions 22. In some embodiments the superconducting element 201 may comprise two or more layers of HTS wires or tapes. In some embodiments the superconducting element 201 may be, at least in part, further divided into two or more lengthwise sections such as to reduce the width of each individual superconducting element which is penetrated by magnetic flux from the magnetic field generating elements.

In some embodiments, the magnetic field generating elements 12 comprise at least one or more high-coercivity permanent magnets. For example, rare-earth type magnets such as NdFeB can be used.

Figure 6A:
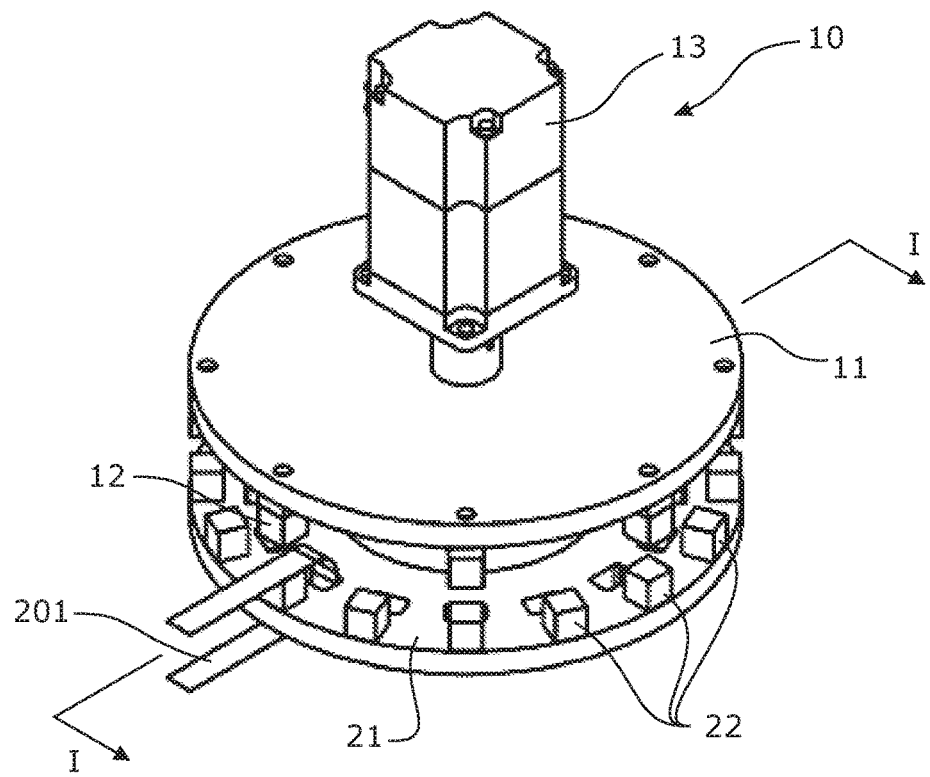
FIG. 6a is a perspective view of an embodiment of an axial-flux superconducting current pump.
Figure 6B:
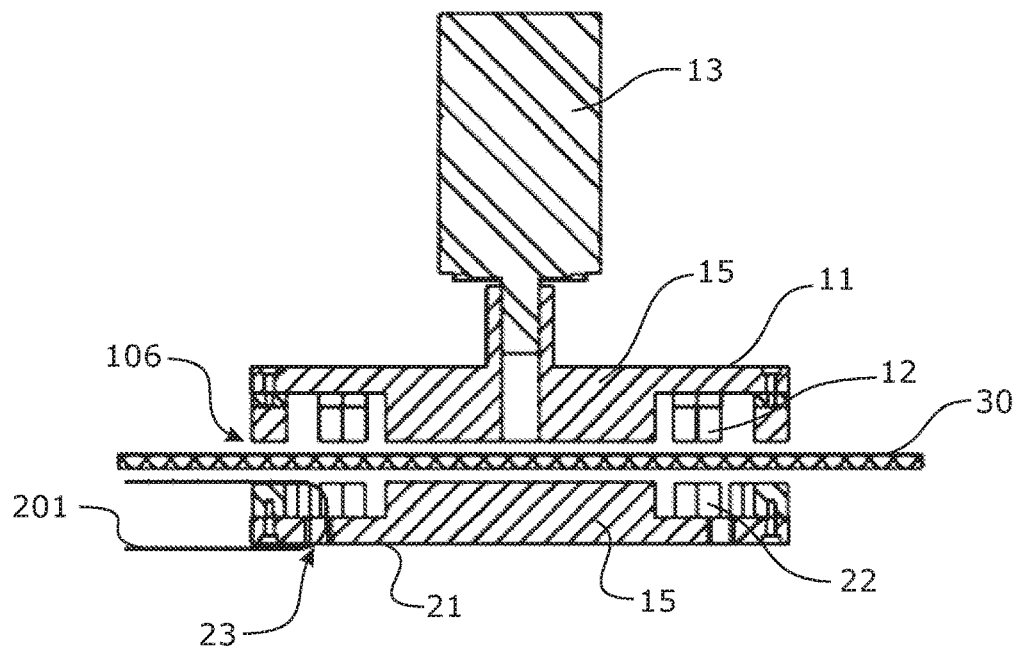

FIGS. 6a and 6b show an embodiment of an axial-flux superconducting current pump 10 and portion of a superconducting circuit 20. As before the current pump comprises an iron rotor 11 upon which are located a plurality of magnetic field generating elements 12, on the surface of the rotor 11 facing the stator 21. The magnetic field elements 12 may comprise one or more of permanent magnets, electromagnets or a combination thereof. The iron rotor 11 is placed outside the cryostat 103 (not shown in FIG. 6a, cryostat wall 30 shown in FIG. 6b). A ferromagnetic stator 21 is placed inside the cryostat 103. The insulating wall 30 of the cryostat is located between the stator 21 and rotor 11 in the gap 106. The pair of ferromagnetic yokes 15 within the rotor 11 and stator 21 acts to guide and increase magnetic flux density in the gap 106 between the stator 21 and the rotor 11. The magnetic circuit is completed by flux passing back across the low reluctance gap located towards the axial centre of the rotor 11 and stator 21.

One or more superconducting elements 201 for example HTS wires are carried by the stator 21 and form part of a superconducting circuit 20 inside the cryostat 103. The HTS stator wires pass through the gap 106 between the rotor 11 and stator 21, thereby entering the magnetic circuit formed by the rotor 11 and stator 21. The HTS stator wires leave the magnetic circuit via regions of low magnetic flux density in the stator. Regions of low magnetic flux density are located at the outer edge of the ferromagnetic stator 21 or may be formed due to openings such as apertures 23 in the ferromagnetic body of the stator 21. In some embodiments, the stator 21 comprises field-focussing ferromagnetic protrusions 22 to further increase the maximum magnetic flux density at the surface of the superconducting element 201. When the magnetic field density at the HTS stator wire surface is higher than the penetration field, $B_{pen}$, the motion of the rotor 11 drives magnetic flux vortices to move across the superconducting element 201, which then causes current to flow around the superconducting circuit 20.

When the superconducting current pump is used to energise a superconducting coil or magnet it may be desirable to vary the rate of increase of current in the superconducting circuit 20. This can be achieved by changing the rotational speed of the rotor 11 by increasing the running speed of the motor 13 to increase the emf across the superconducting circuit 20 until the desired current is reached, then reducing the speed of the motor 13 to maintain the current at a fixed level whilst compensating for dissipation of energy due to factors such as resistive joints in the superconducting circuit and other dissipative losses such as flux motion within the superconducting HTS stator wires.

In some embodiments, the rotational speed of motor 13 is controlled by closed loop control to maintain the pumped current at a desired level. In addition, or instead, the rotor 11 can be moved in the axial direction to cause the rotating magnets 12 to move further away from the stator 21 as the current increases in order to reduce flux density in the gap 106 thus reducing the induced voltage across the superconducting circuit. This also reduces energy losses within the HTS stator wires 201 due to flux friction and other dissipative effects. This approach enables the configuration of the current pump to be adjusted according to requirements such that the axial gap can be optimised. For example it allows either the open circuit voltage to be maximised, or alternatively it enables the "effective internal resistance' of the current pump to be minimised.

The superconducting circuit 20 is contained within a cryostat 103 that operates to maintain the temperature of the superconducting circuit 20 at or below a predetermined operating temperature, particularly, below the superconducting transition temperature of the superconducting circuit. The temperature of various parts of the superconducting circuit can be controlled by design of the cooling manifold which provides the thermal connection between the cryogenic cooling system and the superconducting circuit and current pump stator 21. For example, it may be desirable that the superconducting element such as the HTS stator wires within the superconducting current pump are warmer than the superconducting coil 105 or magnet being energised by the current pump. This approach reduces the flux friction within the HTS stator wire and hence reduces the torque required to move the rotor 11.

Figure 7:
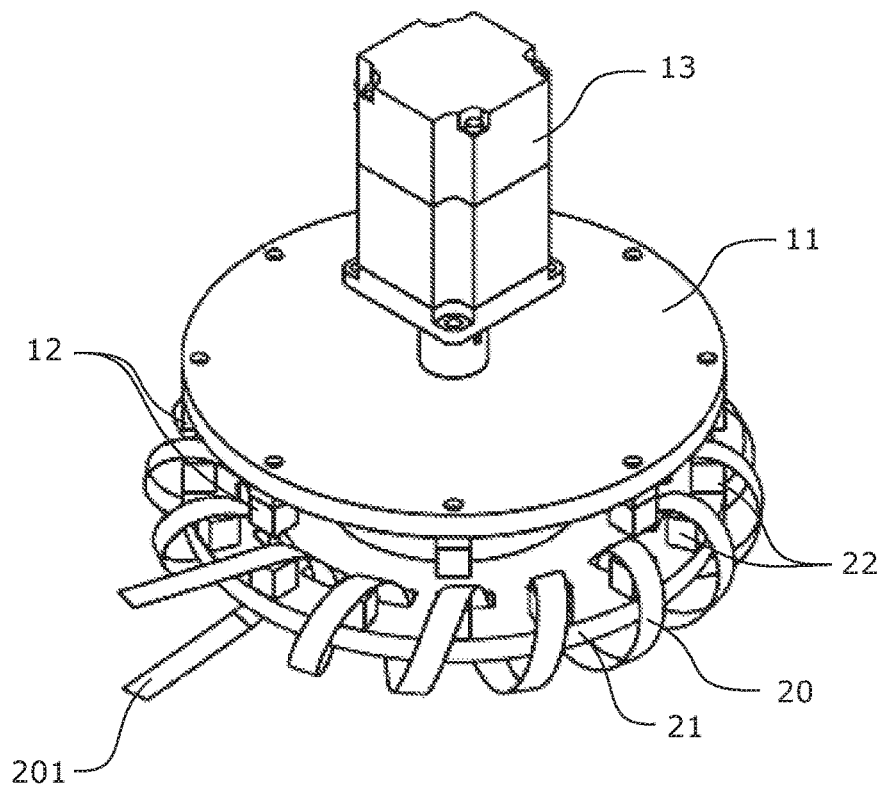
FIG. 7 is a perspective view of another embodiment of an axial-flux superconducting current pump.

FIG. 7 shows another embodiment of an axial-flux superconducting current pump which is similar to that of FIG. 6 but differs by having the superconducting circuit 20 repeatedly entering and leaving the magnetic circuit in a series-connected manner such as to increase the maximum emf pulse across the connected superconducting circuit 20.

Figure 8:
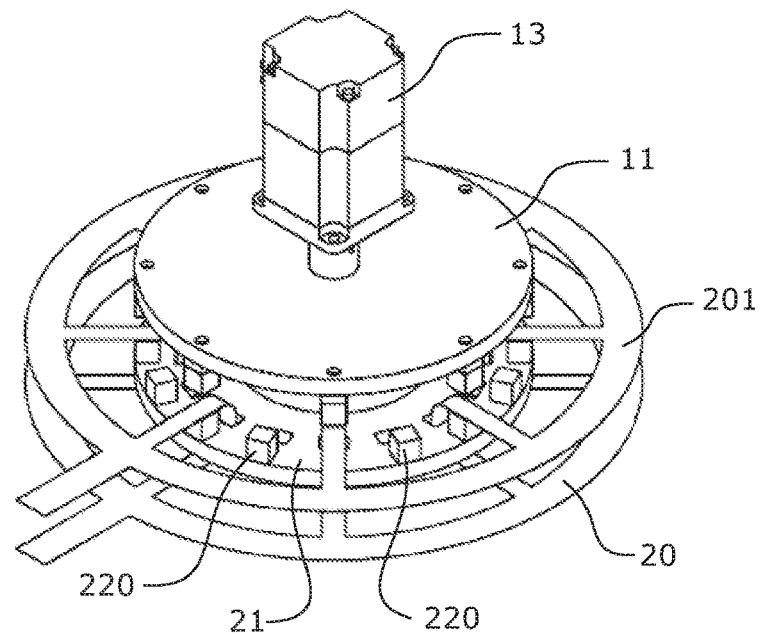
FIG. 8 is a perspective view of a further embodiment of an axial-flux superconducting current pump.

FIG. 8 shows a further embodiment of an axial-flux superconducting current pump which differs from that of FIGS. 6 and 7 by having the superconducting circuit 20 arranged in a plurality of parallel circuit formations disposed about the stator 21, to increase the maximum total current that can be pumped around the connected superconducting circuit 20. In the embodiment of FIG. 8, the stator 21 includes an additional set of ferromagnetic protrusions 22c situated between the superconducting elements 201. These additional protrusions 22c operate to maximise the amplitude of the magnetic field variation at the superconducting elements surface as the magnetic field generating elements 12 on the rotor 11 move relative to the stator 21. This is achieved through a repeated action in which magnetic flux lines are first focussed within the superconducting element 201 as the magnetic field elements 12 pass closest to the HTS superconducting element 201, and the flux lines are subsequently focussed away from the HTS superconducting element 201 as the magnet rotates closest to ferromagnetic protrusion 22c located between the superconducting elements 201. These additional protruding ferromagnetic teeth 22c maximise the number of magnetic flux vortices which exit the superconducting element 201 before the next set of flux lines enter the superconducting element 201.

Another embodiment comprises a radial-flux current pump as well as or instead of the axial-flux current pumps as shown in FIGS. 6, 7 and 8. For example, WO 2012/018265, herein incorporated by reference in its entirety, shows a radial-flux pump and superconductor circuit arrangements.

Figure 9A:
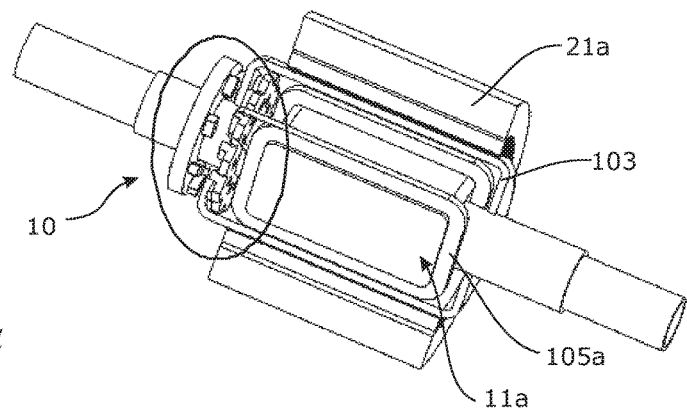
FIG. 9a is a longitudinal cross-section view an embodiment of an axial-flux superconducting current pump integrated co-axially within an electrical generator or motor to energise the superconducting rotor coils of the generator or motor.
Figure 9B:
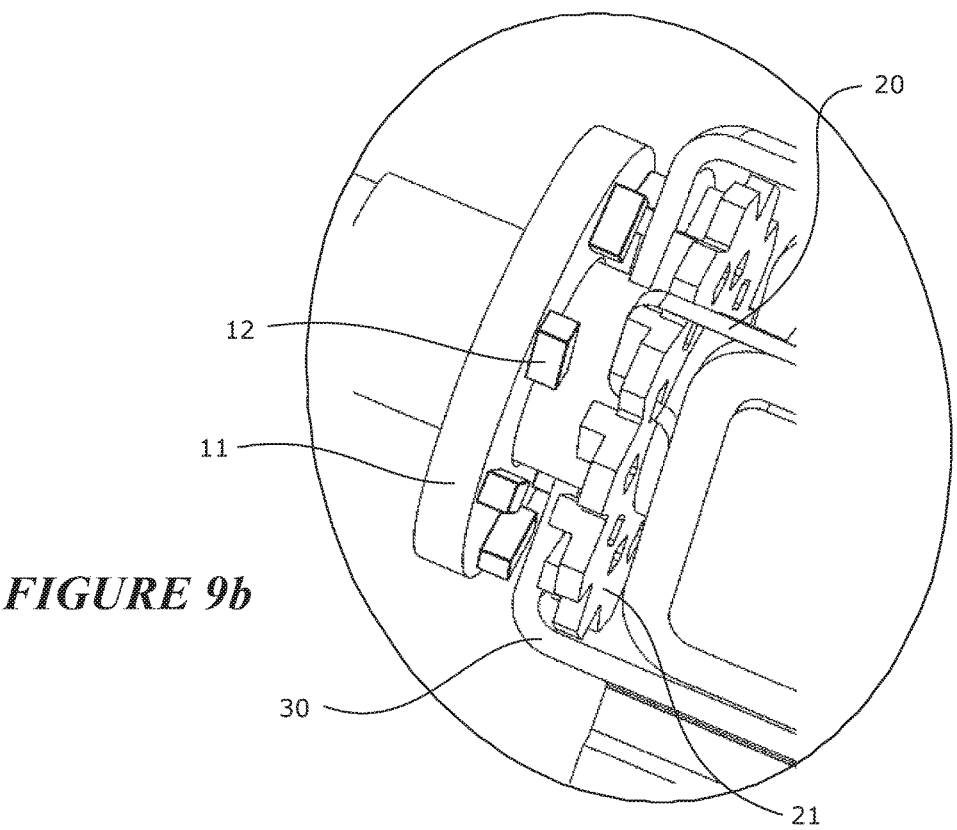

FIG. 9a is a longitudinal cross-section view an embodiment of an axial-flux superconducting current pump integrated co-axially within an electrical generator or motor to energise the superconducting rotor coils of the generator or motor, and FIG. 9b is a close up view of part of the integrated superconducting current pump and electrical generator or motor of FIG. 13a. Electrical generator 13 or electrical motor comprises a stator body 21a and a rotor 11a. The generator rotor comprises a rotating cryostat 103 that contains one or more superconducting rotor coils 105a which are connected within a superconducting circuit that includes a portion 201 which passes through the stator 21 of a superconducting current pump 10. The rotor 11 of the superconducting current pump 10 is located outside the rotating cryostat 103 and is arranged co-axially with the rotor 11a of the generator/motor. The rotor 11 of the current pump rotates relative to the rotor 11a of the generator in either the co-rotating direction or the counter-rotating direction. Current is pumped around the superconducting circuit 20 and excites the superconducting rotor coils 105a of the electrical generator 13 or motor. This embodiment comprises a rotating cryostat, and the rotor outside the rotating cryostat moves relative to the stator within the rotating cryostat. The stator and rotor rotate relative to each other around a common rotational axis with the rotating cryostat.

Application of the invention in this embodiment removes the need for current leads which penetrate the wall of the rotating cryostat, and either rotating electrical contacts or brushless converter technology that is usually required to transfer excitation current from the stationary frame-of-reference to the rotating rotor coils.

In some embodiments the rotor of the superconducting current pump may be able to be translated along the axis of rotation in order to increase or decrease the gap between the rotor of the current pump and the stator of the current pump. This may enable the configuration of the current pump to be adjusted according to requirements such that the axial gap can be optimised. For example this approach can allow either the open circuit voltage to be maximised, or alternatively it can enable the "effective internal resistance' of the current pump to be minimised.

As stated, the invention enables improving the insulating efficiency of the cryostat, and the reliability and ease of maintenance of a system in which a rotating flux pump is employed. The invention physically separates the rotor and stator of a superconducting current pump and a thermal barrier or insulating wall is placed in the gap between the rotor and stator. At least in some embodiments a shaped ferromagnetic yoke increases the magnetic flux density in the gap between the rotor and stator, hence compensating for the reduction in flux density caused by widening the gap to accommodate the insulating wall of the cryostat. The superconducting current pump of the invention removes the need for current leads which would otherwise penetrate the wall of the rotating cryostat. The current pump also removes the need for either rotating electrical contacts or brushless converter technology that is usually required to transfer excitation current from the stationary frame-of-reference to the rotating rotor coils. In particular, the rotor and the means to rotate the rotor, connection between motor and rotor and all bearings are located outside the cryostat and at ambient temperature. As a result, and advantageously, conventional bearings can be used for all moving parts. Further, maintenance and repair of the moving parts becomes a simple procedure that does not require warming up the cold components of the pump or magnet to which it is connected.

In other embodiments of the invention the rotor ie moving part of the current pump located outside of the cryogenic enclosure, may not move with rotation but may translate linearly or semi-linearly repeatedly past the stator (in a single direction), and "rotor" in this specification including claims is to be understood accordingly.

Also, while the rotor is located external to the cryogenic enclosure and the stator within the cryogenic enclosure, the rotor may be located within an associated enclosure which is maintained at a temperature between that of the stator enclosure, and the ambient environment temperature, and "external to the cryogenic enclosure" is also to be understood accordingly.

EXPERIMENTAL

Figure 10:
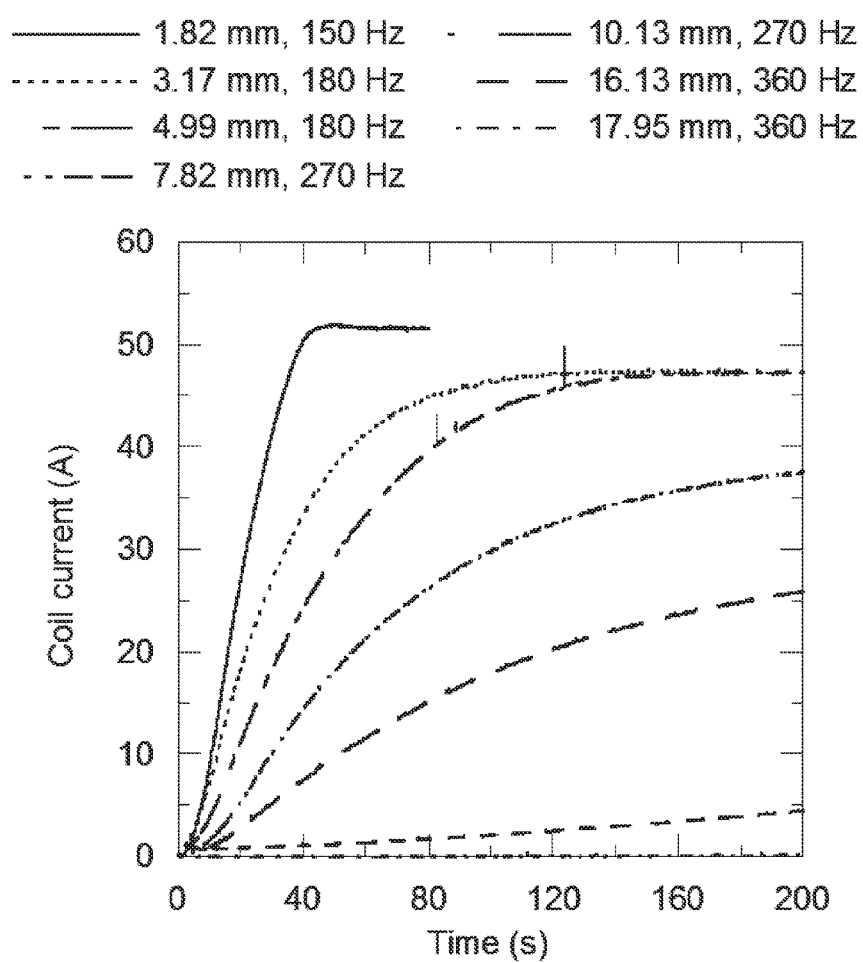
FIG. 10 is a plot of the output current versus time of an axial-flux superconducting current pump of the invention.
Figure 11:
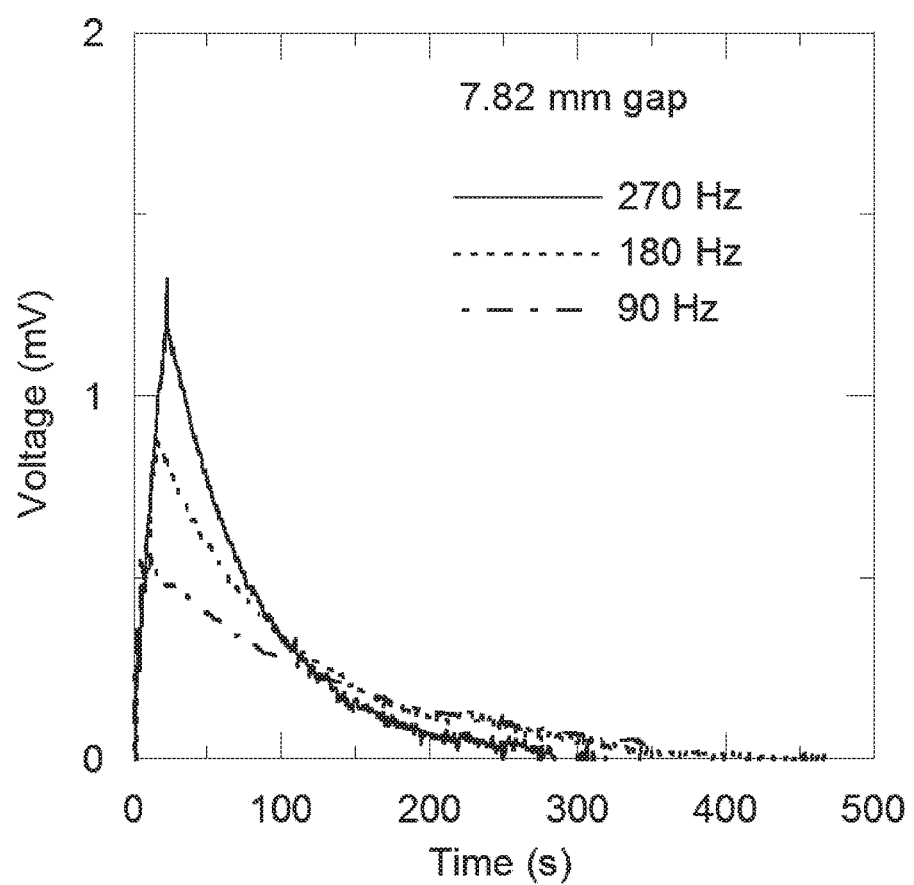
FIG. 11 is a plot of the output voltage versus time of an axial-flux superconducting current pump of the invention.
Figure 12:
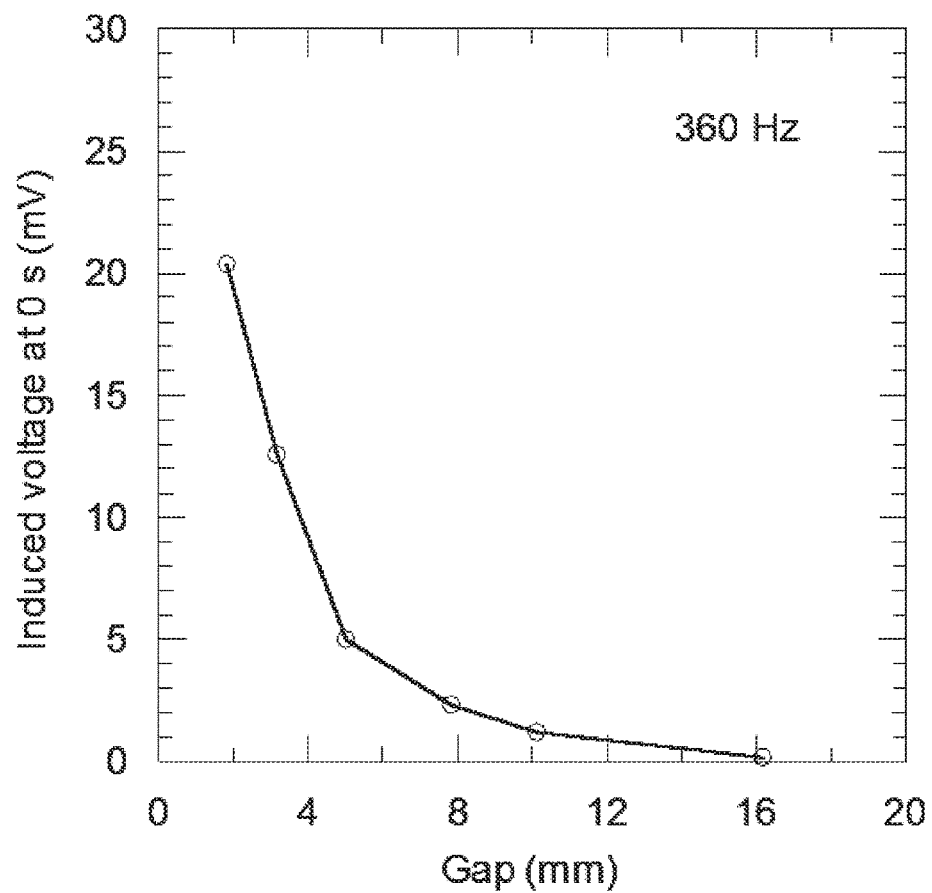
FIG. 12 is a plot of the initial output voltage of an axial-flux current pump of the invention as a function of the axial gap between the rotor and stator.

FIGS. 10, 11, and 12 show experimental results characterising the performance of an example of a superconducting current pump according to the invention, where the superconducting current pump is connected to a superconducting circuit comprising a superconducting coil. In this case the superconducting current pump used was an axial—flux type of the design shown in FIG. 6, where both rotor and stator bodies were fabricated from ferromagnetic iron. The rotor comprises nine equally spaced NdFeB magnets with dimensions ½"×½"×½". The stator and superconducting circuit were operated at 77K. The stator included a single coated-conductor YBCO wire which passed once through the magnetic circuit formed between the stator and the rotor. The superconducting circuit comprised a coil wound from HTS wire which exhibited a coil of ~57 A and an inductance of 2.7 mH. The superconducting coil was connected to the superconducting YBCO wire from the stator using normal conducting metal solder joints. The solder joints form a normal conducting portion of the circuit with a total series resistance of approximately 1 µΩ. Each experiment was initialised such that at t≤0 there was no current flowing in the superconducting circuit and the current pump rotor was stationary. At t=zero the current pump rotor was accelerated from rest such that the frequency of magnetic field variation at the stator increased at a rate of 12.7 Hz/s until the desired steady state frequency was reached.

FIG. 9 shows a graph of current in the superconducting circuit versus time for a series of experimental runs undertaken using an embodiment of an axial-flux superconducting current pump. The value of the axial gap between the rotor and stator was fixed prior to each experimental run and the data acquired for a series of runs using different values of axial gap is shown. In each case, the rotor was steadily accelerated from rest until the frequency at which the rotor magnets passed the superconducting wire reached 48 Hz. This frequency was then held constant for the remainder of each run. The initial current in the superconducting circuit was set to zero. The current in the superconducting circuit is seen to initially increase. This is the result of the emf of the current pump acting to overcome the inductive impedance of the superconducting coil in the superconducting circuit. The rate of increase of current occurs more rapidly when the axial gap is small because the open circuit voltage available from the current pump is larger in this configuration. The current in the superconducting circuit saturates at a fixed maximum current value, $I_{sat}$, which differs according to the size of the axial gap. The value of $I_{sat}$ is determined by the point at which the voltage induced within the superconducting current pump is equal to that required to overcome energy dissipation due to losses in the superconducting circuit. Energy dissipation in the superconducting circuit includes losses from the resistance of normal conducting joints as well as losses due to the interactions between the current and the time varying density of magnetic flux within the superconducting material in the circuit, including the portion of the superconducting circuit which passes through the current pump stator.

FIG. 11 shows a graph of the measured voltage across the portion of the superconducting circuit which lies within the current pump stator. This is plotted as a function of time. The measured voltage data is the average value acquired using an integration time of 0.1 s. It should be noted that if data is acquired using a substantially shorter integration time then the measured voltage also shows a pulse at the operating frequency of the current pump due to the time-varying emf caused as each individual magnet on the rotor passes over the superconducting stator wire. This pulse effect is "averaged out" by the influence of the coil inductance and by using a measurement integration time which is substantially longer than the period of each individual pulse. It can be seen that the measured output voltage rises rapidly as the rotor is initially accelerated to its operating speed. Thereafter the voltage drops away in all cases such that it approaches a value close to but not equal to zero. This behaviour is a feature of superconducting current pump operation. The initial output voltage from the superconducting current pump is determined by the rate at which the superconducting wire within the stator cuts the imposed flux from the rotor. This voltage acts to overcome the impedance of the superconducting coil and excite a current around the superconducting circuit. However, as the current within the circuit increases, the losses within the current pump due to interactions between the time-varying magnetic field and the current also increase. This leads to an "effective internal resistance" of the superconducting current pump and leads to a decrease in the measured output voltage as a function of current. It is observed that the "effective internal resistance" of the current pump increases with increasing operating frequency. The "effective internal resistance" decreases with increasing axial gap. The asymptotic value for the measured steady-state output voltage of the current pump is equal to the voltage required to overcome the resistance of the remainder of the superconducting circuit when operated at the steady-state current, $I_{sat}$.

FIG. 12 shows a plot of the maximum measured output voltage of the superconducting current pump as a function of the gap between the rotor and stator when operated at 360 Hz. At a gap of 1.82 mm the maximum measured output voltage was >20 mV. At a gap of 16.13 mm the output voltage drops to 0.18 mV. This value is more than zero and hence drives current to flow around the superconducting circuit.

Figure 13:
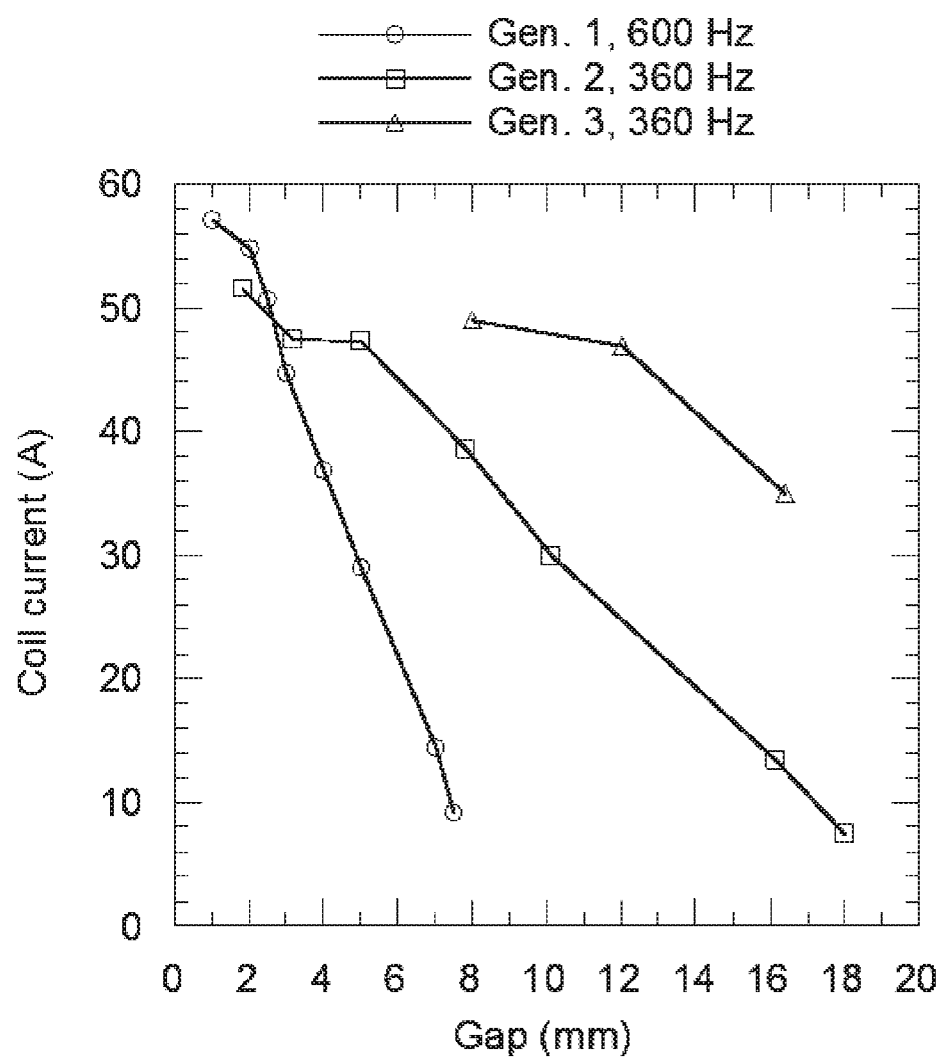
FIG. 13 is a plot of the induced current from three different designs of superconducting current pump.

FIG. 13 shows a plot of the measured value of $I_{sat}$ from three different designs of superconducting current pump. $I_{sat}$ is plotted as function of the gap between the permanent magnet mounted upon the rotor and surface of the superconducting wire upon the stator. In all three configurations YBCO coated conductor wire was used within the stator and the permanent magnet elements comprised NdFeB magnets of similar size. 3 different arrangements for a superconducting current pump are shown and entitled Gen 1, Gen 2 and Gen 3 respectively. Each plot shows the axial magnetic field strength at the stator surface due to a permanent magnet located at an axial distance, x from the stator in the absence of superconducting material. Gen 1 describes a radial current pump arrangement similar to that disclosed in WO2012/018265 which does not include a ferromagnetic yoke. In this arrangement the field experienced at the stator is similar to that of an isolated permanent magnet in free space. Gen 2 describes an axial current pump arrangement such as that shown in FIG. 6 which includes a ferromagnetic body for the rotor and stator such that a low reluctance magnetic circuit is realised between the rotor and stator. The field is measured at the stator surface for an axial gap, x, between the permanent magnet upon the rotor and the stator. Gen 3 describes a further axial current pump arrangement which includes ferromagnetic yoke pieces within the rotor and stator and in which the geometry of the ferromagnetic yoke has been adjusted to further enhance the maximum perpendicular B-field at the stator surface. This data demonstrates that without the use of a ferromagnetic yoke pieces, current pumping across a gap of >10 mm is not readily possible as the imposed b-field falls below $B_{pen}$. However, the use of ferromagnetic yokes on the rotor and stator increases the imposed magnetic field at the stator such that current pumping is able to occur at gaps of more than 15 mm between the rotor and stator. This increase in distance between the rotor and stator enables an insulating wall of the cryostat to be placed between the rotor and stator and thus allows the rotor to be located outside the cryostat such that all moving parts of the current pump at operated at room temperature and do not impose a heat-conduction load on the cryogenic system.

The foregoing description of the invention includes preferred forms thereof. Modifications may be made thereto without departing from the scope of the invention as defined in the accompanying claims.

The invention claimed is:

1. A superconducting current pump arranged to cause a DC electrical current to flow through a superconducting circuit accommodated within a cryogenic enclosure of a cryostat, the superconducting circuit comprising a superconducting coil or coils and one or more superconducting elements, the current pump comprising a rotor external to the cryogenic enclosure and a stator within the cryogenic enclosure, the rotor and stator separated by a gap through which passes a thermally insulating wall of the cryogenic enclosure, the rotor comprising one or more magnetic field generating elements, and the rotor and the stator comprising at least in part a ferromagnetic material to concentrate magnetic flux in a magnetic circuit across the gap between the rotor and the stator and through the wall such that the magnetic flux penetrates through one or more superconducting element(s) of the superconducting circuit associated with the stator so that movement of the rotor external to the cryogenic enclosure relative to the stator within the cryogenic enclosure induces a DC transport current to flow around the superconducting circuit within the cryogenic enclosure.

2. A superconducting current pump according to claim 1 wherein the superconducting circuit passes between ferromagnetic flux-concentrating parts of the stator and rotor such that flux penetrates the superconductor in one direction relative to the direction of DC current flow in the superconducting circuit.

3. A superconducting current pump according to claim 1 wherein the superconducting circuit passes between the rotor and the stator and exits via a region at which the superconducting circuit experiences lower or no magnetic field.

4. A superconducting current pump according to claim 3 wherein the superconducting circuit exits through an aperture in the stator.

5. A superconducting current pump according to claim 1 wherein the superconducting coil or coils has sufficient inductance to incrementally accumulate electrical current through the circuit as the rotor moves.

6. A superconducting current pump according to claim 1 wherein the rotor and stator are displaced from each other in a direction in or substantially parallel to an axis of rotation of the rotor to define said gap.

7. A superconducting current pump according to claim 1 wherein the rotor and stator are arranged concentrically and said gap is around an axis of rotation of the rotor.

8. A superconducting current pump according to claim 7 wherein a cylindrical rotor assembly is located inside or outside a cylindrical stator assembly.

9. A superconducting current pump according to claim 1 wherein superconducting elements are arranged around the stator and the magnetic field generating elements are arranged around the rotor opposite the superconducting elements on the stator.

10. A superconducting current pump according to claim 1 wherein superconducting elements are wound around the stator including passing through apertures in the stator.

11. A superconducting current pump according to claim 1 wherein the one or more magnetic field generating elements comprise one or more permanent magnets or electromagnets.

12. A superconducting current pump according to claim 1 wherein the magnetic flux density in the gap is high enough to penetrate through a superconducting element disposed about the stator and form localized flux vortices at a microscopic scale but not eliminate a superconducting current path sufficient to carry the net DC transport current flowing through the superconducting circuit at a macroscopic level.

13. A superconducting current pump according to claim 1 comprising a motor control system arranged to control the speed of the rotor.

14. A superconducting current pump according to claim 13 wherein comprising a control system arranged to control a variable gap between the rotor and stator.

15. A superconducting current pump according to claim 14 further comprising a sensor arranged to provide a signal to the control system indicative of the current around the superconducting circuit.

16. A system including a superconducting current pump according to claim 1 wherein the cryostat includes a refrigeration system comprising a liquid cryogen operable to cool by latent heat of evaporation and/or a thermomechanical refrigerator.

17. A system including a superconducting current pump according to claim 1 wherein the cryostat wall disposed between the rotor and stator has low electrical conductivity.

18. A system including a superconducting current pump according to claim 1 wherein the cryostat is a rotating cryostat.

19. A system according to claim 18 wherein the stator and rotor rotate relative to each other around a common rotational axis with the rotating cryostat.

20. A superconducting current pump arranged to cause a DC electrical current to flow through a superconducting circuit accommodated within a cryogenic enclosure of a cryostat, the superconducting circuit comprising a superconducting coil or coils and one or more superconducting elements, the current pump comprising a rotor external to the cryogenic enclosure and a stator within the cryogenic enclosure so that relative movement of the rotor external to the cryogenic enclosure induces a DC transport current to flow around the superconducting circuit within the cryogenic enclosure.

* * * * *